(12) United States Patent
Provenzano et al.

(10) Patent No.: US 8,490,815 B2
(45) Date of Patent: Jul. 23, 2013

(54) METHOD AND SYSTEM OF A REVERSIBLE NOSE FACEPLATE

(75) Inventors: Charles J. Provenzano, Houston, TX (US); Michael Leung, Missouri City, TX (US)

(73) Assignee: DirectConnect, Houston, TX (US)

( * ) Notice: Subject to any disclaimer, the term of this patent is extended or adjusted under 35 U.S.C. 154(b) by 975 days.

(21) Appl. No.: 12/563,286

(22) Filed: Sep. 21, 2009

(65) Prior Publication Data

US 2011/0068103 A1    Mar. 24, 2011

(51) Int. Cl.
*H02G 3/08* (2006.01)
*H02G 3/14* (2006.01)
*B65D 45/16* (2006.01)
*B65D 41/16* (2006.01)
*F16L 5/00* (2006.01)
*H05K 5/03* (2006.01)
*H01B 17/26* (2006.01)
*H01B 17/30* (2006.01)
*H01R 9/16* (2006.01)

(52) U.S. Cl.
USPC ............. 220/241; 220/3.3; 220/3.7; 220/242; 220/324; 220/786; 248/56; 174/66; 174/67; 174/151; 174/153 R

(58) Field of Classification Search
USPC ...... 220/3.3, 3.7, 241, 242, 324, 786; 248/56; 174/66, 67, 151, 153 R
See application file for complete search history.

(56) References Cited

U.S. PATENT DOCUMENTS

| | | |
|---|---|---|
| 2,716,225 A | 8/1955 | McCubbin |
| 2,987,690 A | 6/1961 | Marbais |
| D269,429 S | 6/1983 | Doyle |
| D283,221 S | 4/1986 | West |
| 4,669,802 A * | 6/1987 | Schaffer ........................ 439/535 |
| 4,688,747 A * | 8/1987 | Helmsdorfer et al. .......... 248/56 |
| 6,064,003 A | 5/2000 | Moore |
| 6,211,465 B1 | 4/2001 | Streit |
| 6,793,524 B2 | 9/2004 | Clark |
| 6,840,483 B1 | 1/2005 | Dickens |
| D502,386 S | 3/2005 | Provenzano et al. |

(Continued)

OTHER PUBLICATIONS

Office Action dated Jan. 23, 2009 in U.S. Appl. No. 11/550,028.

(Continued)

*Primary Examiner* — Anthony Stashick
*Assistant Examiner* — Andrew T Kirsch
(74) *Attorney, Agent, or Firm* — Mark E. Scott; Conley Rose, P.C.

(57) ABSTRACT

Reversible nose faceplate. At least some of the illustrative embodiments are systems including a faceplate and a nose member. The nose member includes: an extension portion; a nose portion; a first abutting surface; a second abutting surface; a first set of ears coupled to the extension portion adjacent the nose portion; and a second set of ears coupled to the extension portion opposite the first set of ears. The nose member is configured to couple to the faceplate in multiple configurations, including: a first configuration in which the nose portion protrudes through a nose aperture of the faceplate in the direction of the front side of the faceplate, the first abutting surface abuts the back side of the faceplate, and the faceplate is affixed to the first set of ears; and a second configured in which the nose portion protrudes in the direction of the back side of the faceplate, the second abutting surface abuts the back side of the faceplate, and the faceplate is affixed to the second set of ears.

25 Claims, 8 Drawing Sheets

U.S. PATENT DOCUMENTS

| | | |
|---|---|---|
| D503,156 S | 3/2005 | Provenzano |
| 6,909,060 B1 | 6/2005 | Shotey |
| 7,141,744 B2 | 11/2006 | Cloutier |
| 7,271,339 B2 | 9/2007 | Dinh |
| D554,475 S | 11/2007 | Gorin |
| 7,390,964 B2 | 6/2008 | Gorin |
| 7,399,920 B2 | 7/2008 | Gorin |
| 7,563,979 B1 * | 7/2009 | Gretz .............................. 174/66 |
| 2008/0110886 A1 | 5/2008 | Provenzano |

OTHER PUBLICATIONS

Office Action dated Apr. 7, 2009 in U.S. Appl. No. 11/550,208.
Office Action dated Aug. 7, 2009 in U.S. Appl. No. 11/550,028.
Gretz, U.S. Appl. No. 90/010,708, "Request for Reexamination of U.S. Patent No. 7,563,979", Sep. 23, 2009.

* cited by examiner

METHOD AND SYSTEM OF A REVERSIBLE NOSE FACEPLATE

BACKGROUND

Embedding electrical and audio visual wire and cables within a wall is a practice of installers. To get the wiring or cabling into the wall a hole is cut in the sheetrock. The hole creates an eye sore which installers cover with faceplates. Faceplates are manufactured in various shapes, sizes, and colors. Frequently, installers have an installation project where they need to cover the hole in the wall while still enabling the wire or cables to pass through. This limitation requires installers to keep in stock a faceplate inventory so that the proper faceplate will be on hand, which inventory requirement is inconvenient and incurs additionally cost for the installer.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
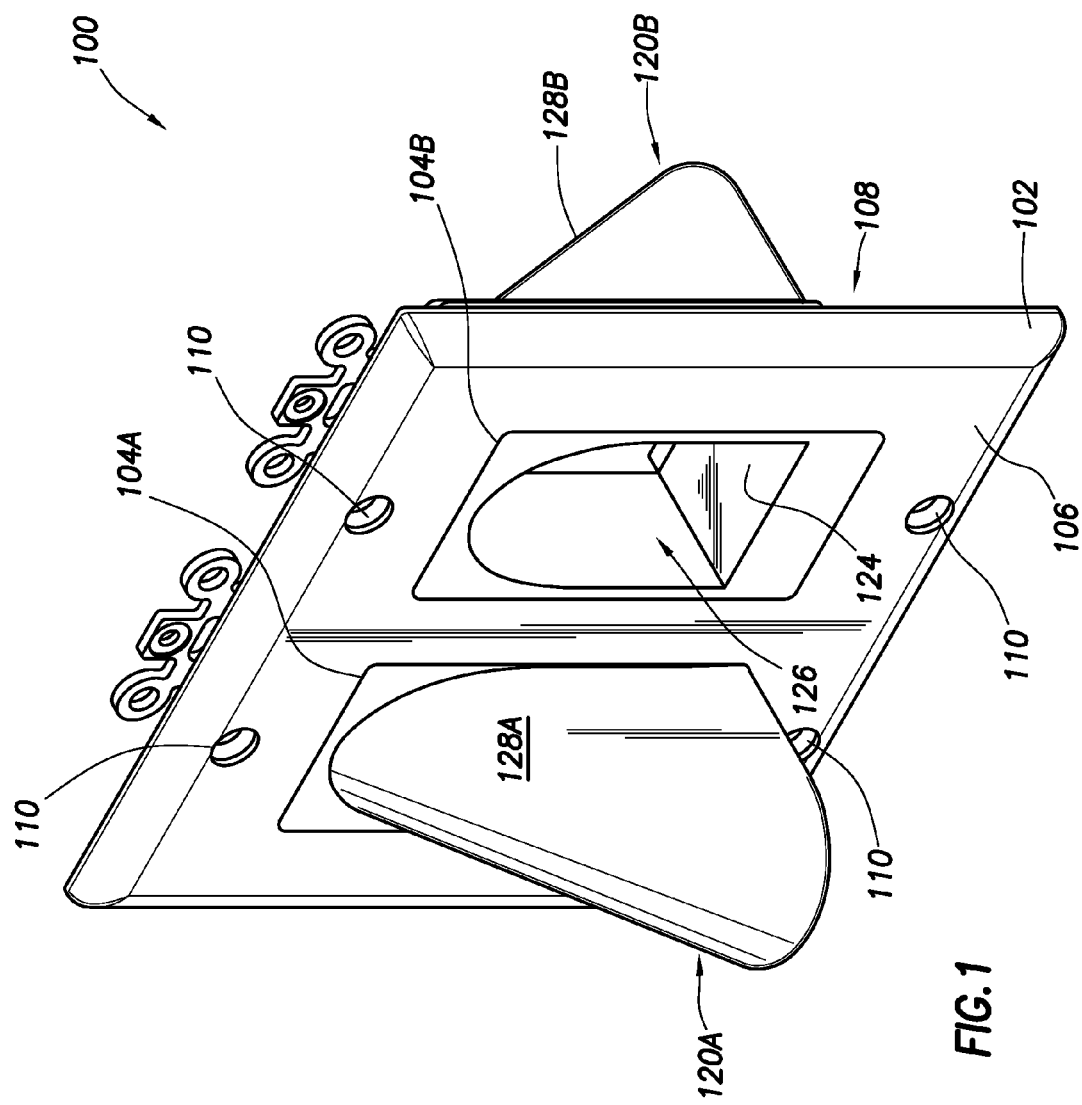
FIG. 1 shows a perspective view of a faceplate system in accordance with at least some embodiments.

FIG. 1 illustrates a perspective view of a faceplate system 100 in accordance with at least some embodiments. In particular, illustrative faceplate system 100 comprises a faceplate 102 that has at least one, and as illustrated two, nose apertures 104. Faceplates with a single nose aperture 104 are referred to as single-gang faceplates, and faceplates with two nose apertures 104 are referred to as double-gang faceplates. Faceplates with rectangular nose apertures 104 as illustrated in FIG. 1 are known as "decorator" style faceplates; however, nose apertures in the faceplate 102 with different shapes (e.g., square, circular) may be equivalently used. The illustrative faceplate 102 defines a front side 106 and a backside 108 (not visible in FIG. 1). Further, the faceplate 102 has a plurality of fastener apertures 110, through which fasteners (such as screws, not shown in FIG. 1) telescope. As will be discussed more below, the fasteners couple the faceplate 102 and an underlying nose member 120, and the nose members 120 couple the faceplate 102 to a surface (such as wall, desk, or entertainment center).

The faceplate system 100 further comprises at least one nose member 120, and as illustrated two such nose members 120. In accordance with various embodiments, each nose member 120 is configured to couple to the faceplate 102 in a plurality of configurations, and as illustrated two configurations. For example, nose member 120A extends through the nose aperture 104A and protrudes in the direction of the front side 106 of the faceplate 102. Likewise, nose member 120B couples to the faceplate and protrudes in the direction of the backside 108 of the faceplate 102. However, the nose members 120 are identical, and thus nose member 120A could likewise couple to the faceplate 102 in such a way as to protrude in the direction of the backside 108 of the faceplate 102, and nose member 120B could likewise couple to the faceplate 102 in such as way as to protrude through the nose aperture in the direction of the front side 106 of the faceplate 102. Each nose member 120 has an extension portion 124 that defines an aperture 126. Further, each nose member 120 has a nose portion 128. On a first side of the extension portion 124 the aperture 126 is unoccluded (e.g., the portion of aperture 126 of nose portion 120B visible in FIG. 1). On a second side the aperture is partially occluded by the nose portion 128.

Figure 2:
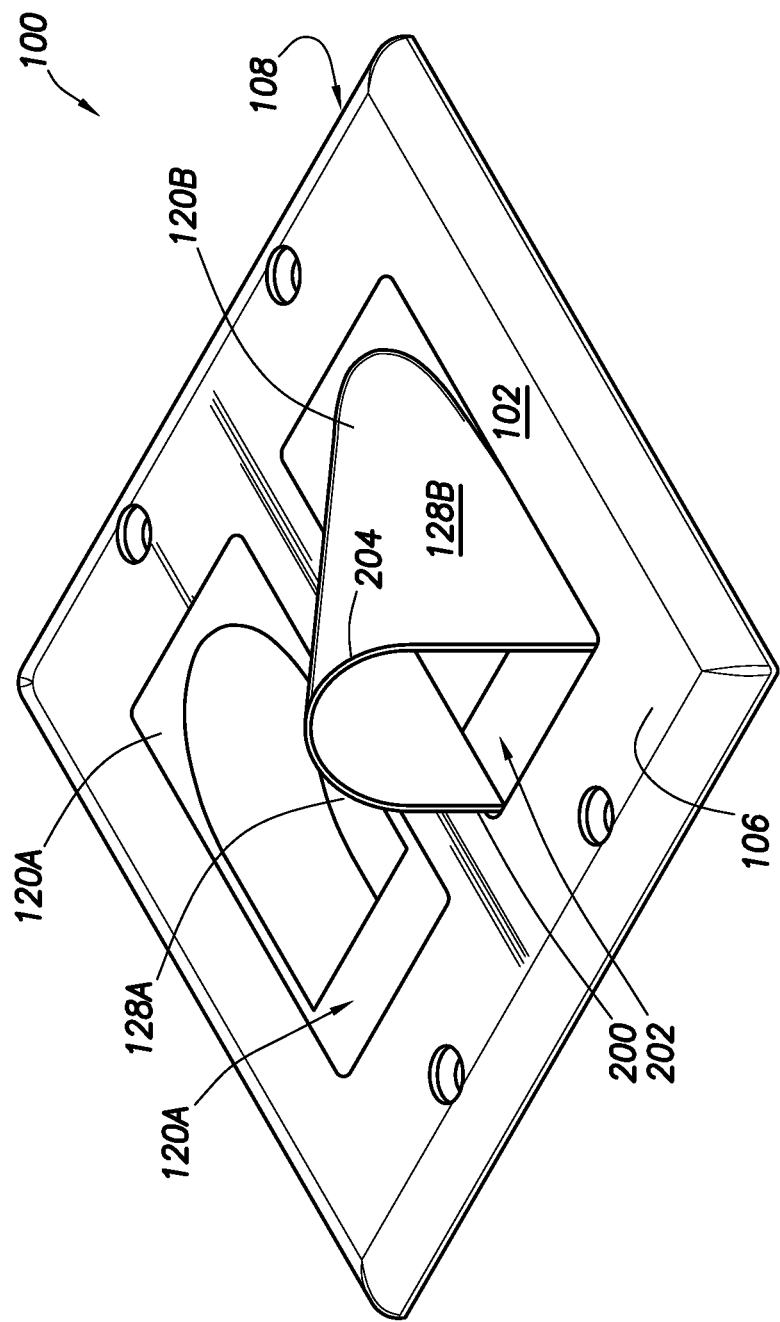
FIG. 2 shows a perspective view of a faceplate system in accordance with at least some embodiments.

FIG. 2 illustrates a perspective view of the faceplate system 100 of FIG. 1, except with the orientations of the nose members 120 reversed and from a different angle, to more fully show various features. In particular, FIG. 2 illustrates nose member 120A coupled to the faceplate 102 such that nose member 120A protrudes in the direction of the backside 108 of the faceplate, and nose member 120B coupled to the faceplate 102 such that nose member 120B protrudes in the direction of the front side 106 of the faceplate 102. Moreover, each nose portion 128 has a nose edge 200 that defines a passage 202 (only the passage 202 for nose portion 128A visible in FIG. 2) in communication with the aperture 126. While in the illustrative faceplate system 100 a single passage 202 is formed by the nose edge 200, the nose portion 128 of each nose member 120 may be equivalently configured to define multiple distinct passages.

Each nose portion 128 of the illustrative embodiments is shown rounded at the nose tip 204, and likewise rounded at the intersection of the nose and extension portion 124 (i.e., the bridge region of the nose). However, in other embodiments the nose portion 128 takes other shapes. For example, in other embodiments the passage 202 is square or rectangular, and the nose portion 128 may thus have defined edges running from the nose tip 204 to the bridge region. Any nose portion 128 shape, and correspondingly any passage 202 shape, may be equivalently used.

Figure 3:
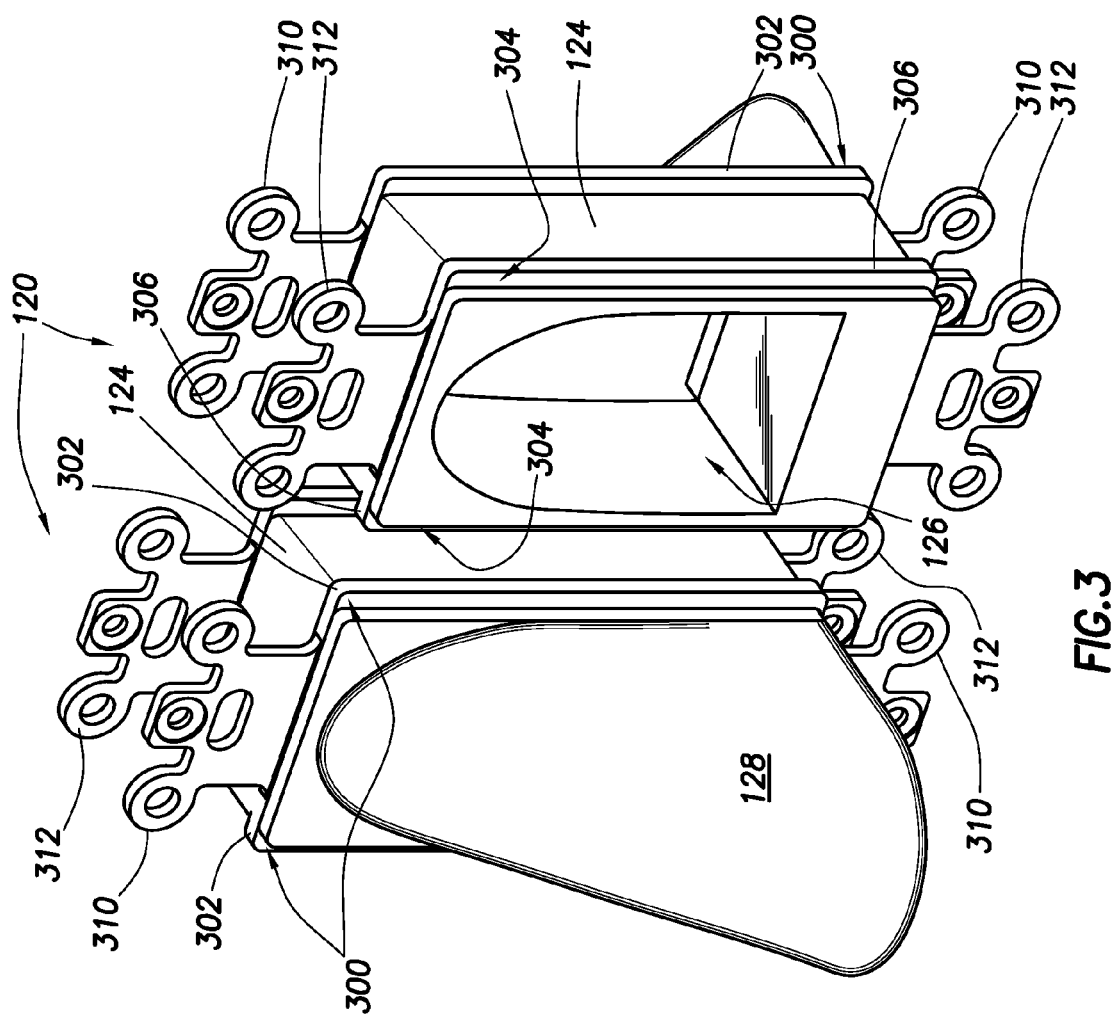
FIG. 3 shows a perspective view of both the front side and backside of a nose member in accordance with at least some embodiments.

FIG. 3 simultaneously shows both a front and rear perspective view of a nose member 120 in accordance with at least some embodiments. In particular, the nose member 120 has extension portion 124 that defines the aperture 126 therein. The extension portion 124 has coupled thereto and/or defines abutting surfaces 300 adjacent to the nose portion 128. In the specific embodiments shown, the abutting surfaces 300 are formed by first flange portions 302. The extension portion 124 also has coupled thereto and/or defines abutting surfaces 304 disposed on the extension portion 124 opposite the abutting surfaces 300. In the specific embodiments shown, the abutting surfaces 304 are formed by second flange portions 306. The abutting surfaces 300 define a first plane, and abutting surfaces 304 define a second plane, and in some embodiments the planes defined by the abutting surfaces are substantially parallel. As will be discussed more thoroughly below, in both the front side 106 protruding and backside 108 protruding orientations of a nose member 120 an abutting surface abuts the backside 108 of the faceplate 102.

FIG. 3 also illustrates that each nose member 120 in accordance with the various embodiments comprises two sets of ears. In particular, each nose member 120 comprises a first set of ears 310, the first set of ears adjacent to the nose portion 128. Each ear of the first set of ears 310 are coplanar with each other, couple to opposite sides of the extension portion 124, and as illustrated the first set of ears 310 define a plane parallel to the plane defined by the first abutting surfaces 300. In some cases, a surface of the first set of ears 310 is coplanar with the abutting surfaces 300. Moreover, each nose member 120 comprises a second set of ears 312 coupled to the extension portion 124, and the second set of ears disposed opposite the nose portion 128 (i.e., opposite the first set of ears 310). Each ear of the second set of ears 312 are coplanar with each other, couple to opposite sides of the extension portion 124, and as illustrated the second set of ears 312 define a plane parallel to the plane defined by the second abutting surface 304. In some case, a surface of the second set of ears 312 is coplanar with the abutting surfaces 304.

In accordance with the various embodiments, one set of ears 310, 312 couple to the faceplate 102 (not shown in FIG. 3), and the other set of ears is either present but not used, or the other set of ears is removed from the extension portion. For example, if the nose member 120 couples to the faceplate 102 such that the nose portion 128 protrudes through the nose aperture 104 in the direction of the front side 106 of the faceplate 102, the first set of ears 310 couple to the faceplate 102 and the second set of ears 312 is not used. Likewise, if the nose member 120 couples to the faceplate 102 such that the nose portion 128 protrudes in the direction of the backside 108 of the faceplate 102, the second set of ears 312 couple to the faceplate 102 and the first set of ears 310 is not used. A set of ears that is not used in a particular situation may be removed, and illustrative mechanisms to enable removal of the unused set of ears are discussed below.

Figure 4:
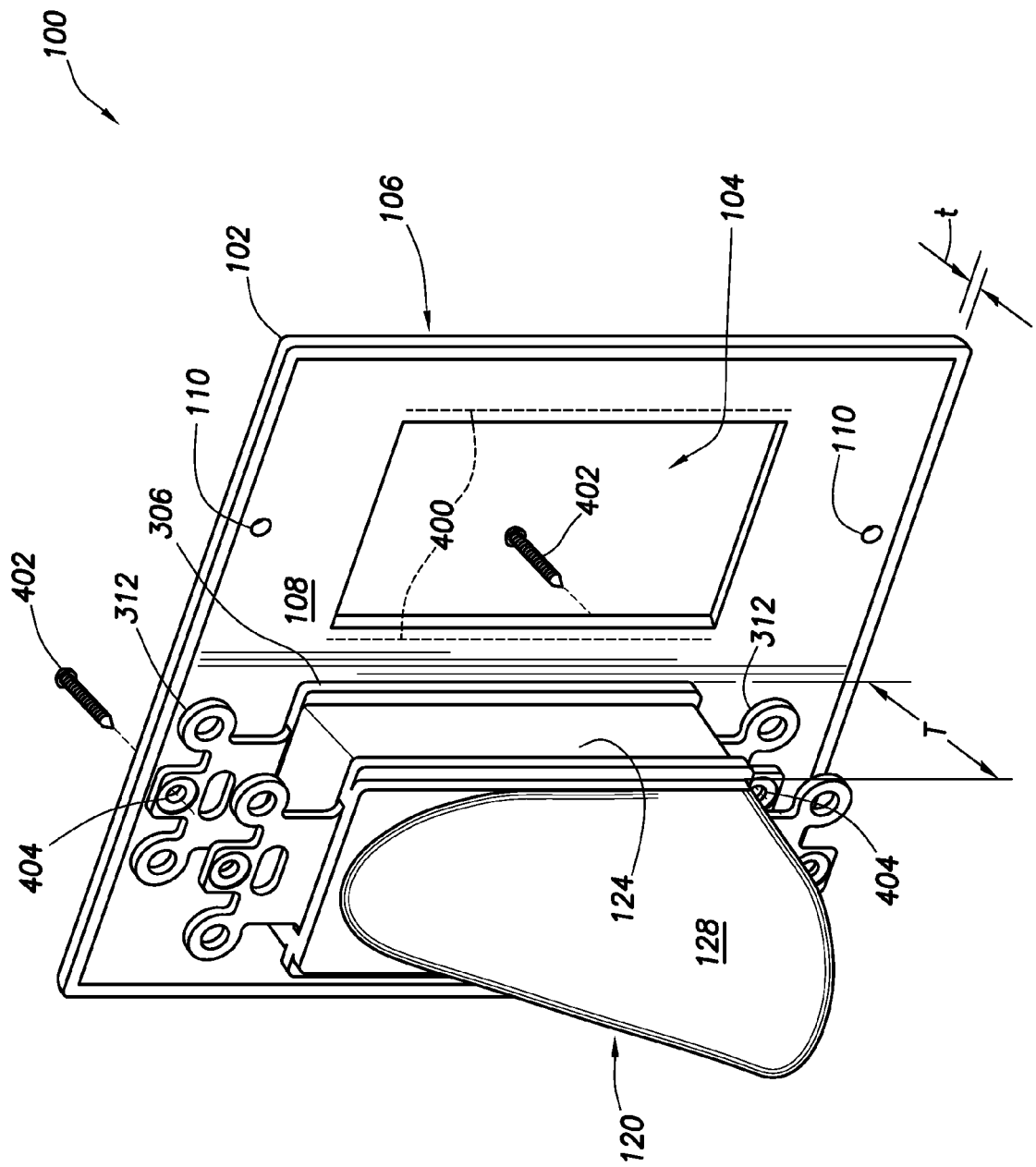
FIG. 4 shows a perspective view of a faceplate system with the nose member coupled such the nose portion protrudes in the direction of the backside of the faceplate in accordance with at least some embodiments.

FIG. 4 is a perspective view of the backside 108 of a faceplate system 100 to more fully discuss the relationship between the nose member 120 and the faceplate 102 when the nose member 120 couples in a configuration in which the nose member protrudes in the direction of the backside 108 of the faceplate 102. In particular, the illustrative faceplate 102 comprises two rectangular nose apertures 104 (only one of which is visible in FIG. 4). Moreover, the faceplate 102 comprises two sets of fastener apertures 110 (only one set of which is visible in FIG. 4). When coupling a nose member 120 such that the nose portion 128 protrudes in the direction of the backside 108 of the faceplate, the extension portion 124 of the nose member 120 is oriented in position with nose aperture 104 such that the abutting surfaces 304 (not visible in FIG. 4) created by the flange portions 306 abut the backside 108 of the faceplate 102. Illustrative locations at which the abutting surfaces 304 abut the backside 108 of a faceplate 102 are shown in relation to the unused nose aperture 104. In the particular embodiments, the abutting surfaces 304 abut the backside 108 in the locations between the dashed lines 400 and the nose aperture 104; however, the abutting surfaces 304 may be configured to abut the backside 108 of the faceplate to a greater or lesser extent.

In the particular embodiment of FIG. 4, the faceplate 102 and nose member 120 couple by way of a set of fasteners 402. In particular, each ear of the set of ears 312 has an aperture 404 that aligns with the fastener apertures 110 associated with the particular nose aperture 104. The fastener apertures 110 have internal diameters greater than the internal diameters of apertures 404. A fastener 402 telescopes into a fastener aperture 110 from the front side 106 of the faceplate 102, and the fastener 402 then threads to the aperture 404 in the respective ear 312. Stated otherwise, the mating threads for each fastener 402 are in the apertures 404 in each ear of the set of ears 312. In some embodiments, the set of ears 312 have surfaces that are coplanar with the abutting surfaces 304 such that the set of ears 312 likewise abut the backside 108 of the faceplate. However, in other embodiments the set of ears 312 may be spaced apart from the backside 108 even when affixed to the faceplate 102 by the illustrative fasteners.

Still referring to FIG. 4, the extension portion 124 defines a thickness "T" greater than the thickness "t" of the faceplate 102. In some embodiments the thickness T is 0.5 inches or more, and in a particular embodiment the thickness T is 0.75 inches. When the nose member 120 is coupled such that the nose portion 128 protrudes in the direction of the back side 108 of the faceplate 102 as shown in FIG. 4, the thickness T of the extension portion 124 enables the nose portion 128 to extend further into the wall or work box such that the thickness of the wall board material (e.g., sheetrock) does not unduly limit how much of the aperture 202 (FIG. 2) created by the nose portion 128 may be utilized for wires, and the like.

Figure 5:
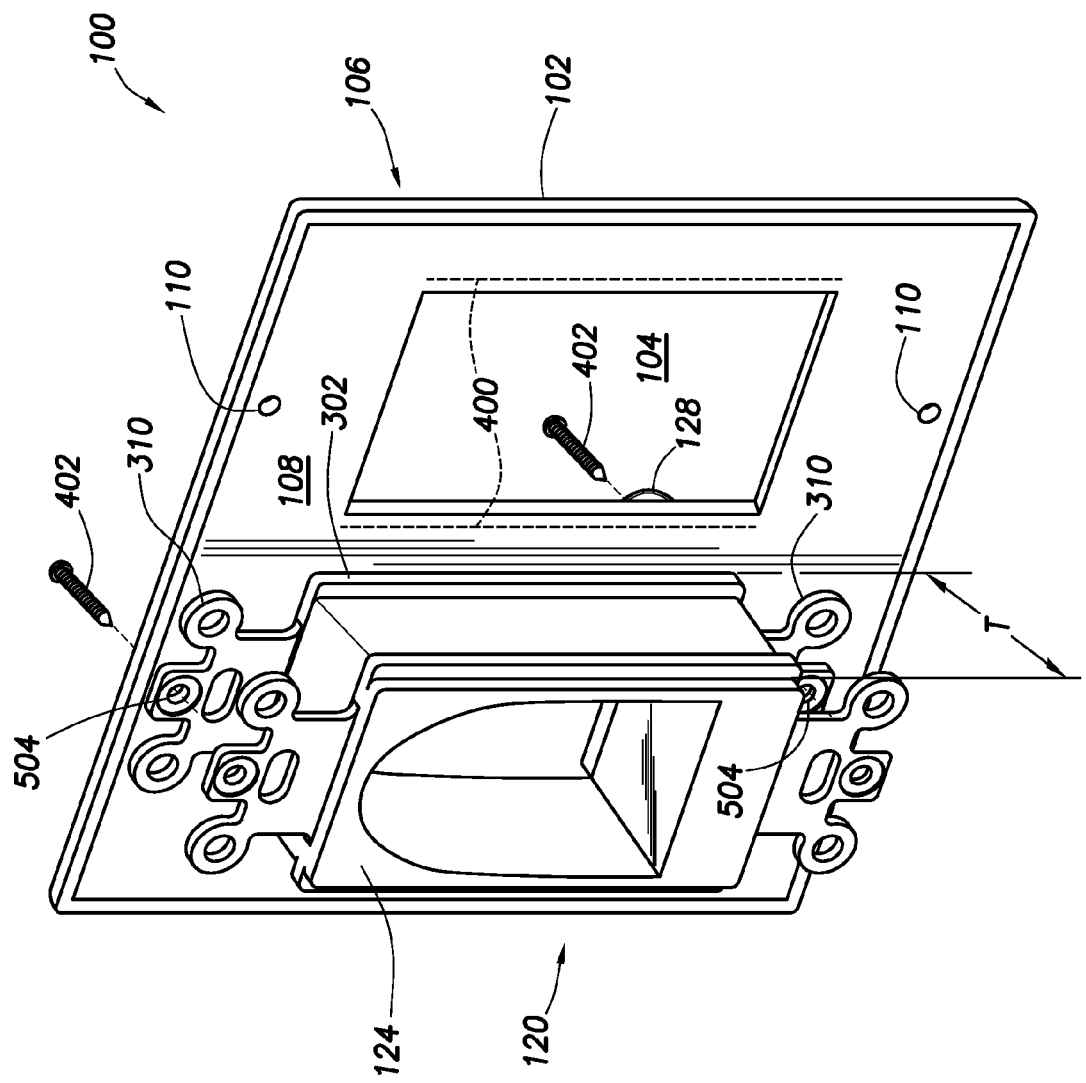
FIG. 5 shows a perspective view of a faceplate system with the nose member coupled such the nose portion protrudes in the direction of the front side of the faceplate in accordance with at least some embodiments.

FIG. 5 is a perspective view of the backside 108 of a faceplate system 100 to more fully discuss the relationship between the nose member 120 and the faceplate 102 when the nose member 120 couples in a configuration in which the nose portion 128 protrudes in the direction of the front side 106 of the faceplate 102. In particular, the illustrative faceplate 102 comprises two rectangular nose apertures 104 (only one of which is visible in FIG. 5). Moreover, the faceplate 102 comprises two sets of fastener apertures 110 (only one set of which is visible in FIG. 5). When coupling a nose member 120 such that the nose portion 128 protrudes in the direction of the front side 106 of the faceplate, the nose portion 128 extends through the nose aperture 104, and the extension portion 124 of the nose member 120 is oriented such that the abutting surfaces 300 (not visible in FIG. 5) created by the flange portions 302 abut the backside 108 of the faceplate 102. Illustrative locations at which the abutting surfaces 300 abut the backside 108 of a faceplate 102 are shown in relation to the unused nose aperture 104. In the particular embodiments, the abutting surfaces 300 abut the backside 108 in the locations between the dashed lines 400 and the nose aperture 104; however, the abutting surfaces 300 may be configured to abut the backside 108 of the faceplate to a greater or lesser extent.

In the particular embodiment of FIG. 5, the faceplate 102 and nose member 120 couple by way of fasteners 402. In particular, each ear of the set of ears 310 has an aperture 504 that aligns with the fastener apertures 110 associated with the particular nose aperture 104. The fastener apertures 110 have internal diameters greater than the internal diameters of apertures 504. A fastener 402 telescopes into a fastener aperture 110 from the front side 106 of the faceplate 102, and the fastener 402 then threads to the aperture 504 in the respective ear 310. Stated otherwise, the mating threads for each fastener 402 are in the apertures in each ear of the set of ears 310. In some embodiments, the set of ears 310 have surfaces that are coplanar with the abutting surfaces 300 such that the set of ears 310 likewise abut the backside 108 of the faceplate. However, in other embodiments the set of ears 310 may be spaced apart from the backside 108 even when affixed to the faceplate 102 by the illustrative fasteners.

Still referring to FIG. 5, when the nose portion 128 protrudes in the direction of the front side 106 of the faceplate 102 as shown in FIG. 5, the thickness T of the extension portion 124 protrudes in the direction of the backside 108 of the faceplate 102. Thus, comparing FIGS. 4 and 5, when protruding in the direction of the backside 108 of the faceplate 102 the nose portion 128 extends further from the faceplate 102 by at least the thickness T than the nose portion 128 extends when coupled protruding in the direction of the front side 106 of the faceplate 102. The extended distance of the nose portion 128 may not be needed in the front side 106 protruding embodiments as the wall board thickness partially blocking the aperture 202 is not an issue on the front side 106 of the faceplate 102.

Figure 6:
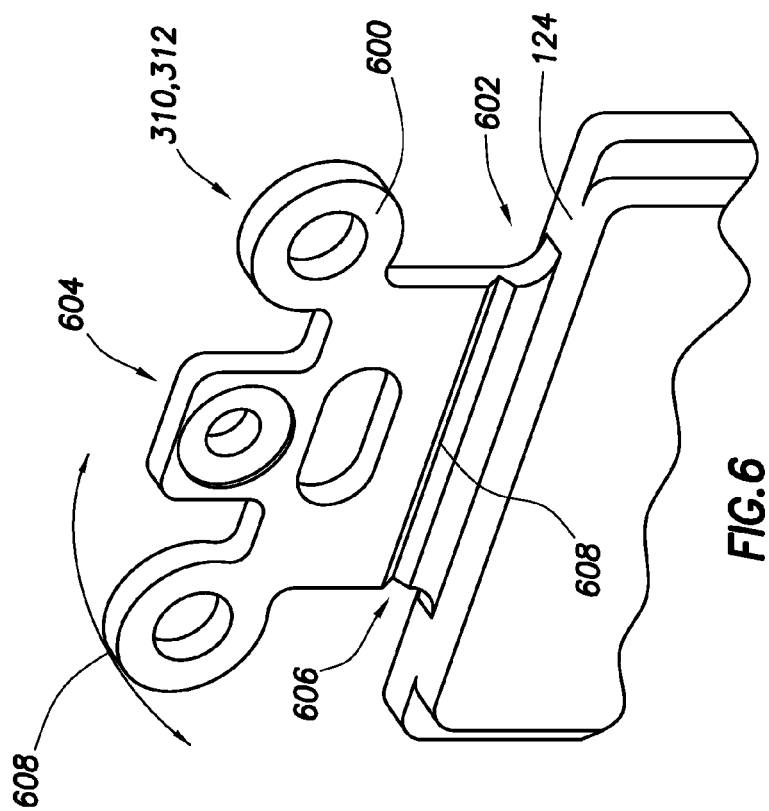
FIG. 6 shows a perspective view of an ear in accordance with at least some embodiments.

As discussed above, each nose member 120 has two sets of ears 310, 312, yet only one set of ears is used to couple the faceplate 102 to the nose member 120. In some embodiments, the unused set of ears 310, 312 may be left in place. However, in other embodiments the unused set of ears 310, 312 is removed. FIG. 6 shows an illustrative ear 600 in accordance with at least some embodiments, where ear 600 is illustrative of any ear of either set of ears 310, 312. Illustrative ear 600 has a proximal end 602 coupled to the extension portion 124, and a distal end 604 extending outward from the extension portion 124. Moreover, illustrative ear 600 has feature 606 at the proximal end 602 at which feature the ear detaches from the extension portion 124. In the illustrative case of FIG. 6, the feature is a narrowing of the thickness of the ear 600 as illustrated by trench 608. In the illustrative case of trench 608, the ear 600 may be removed by movement of the ear 600 as illustrated by line 608. That is, based on the movement illustrated by line 608, the material of the ear 600 (e.g., plastic) breaks along the trench 606, thus enabling removal of the ear 600. While trench 606 is shown as having a triangular cross-section, the trench 606 may equivalently have any cross-sectional shape (e.g., square, semi-circular).

Figure 7:
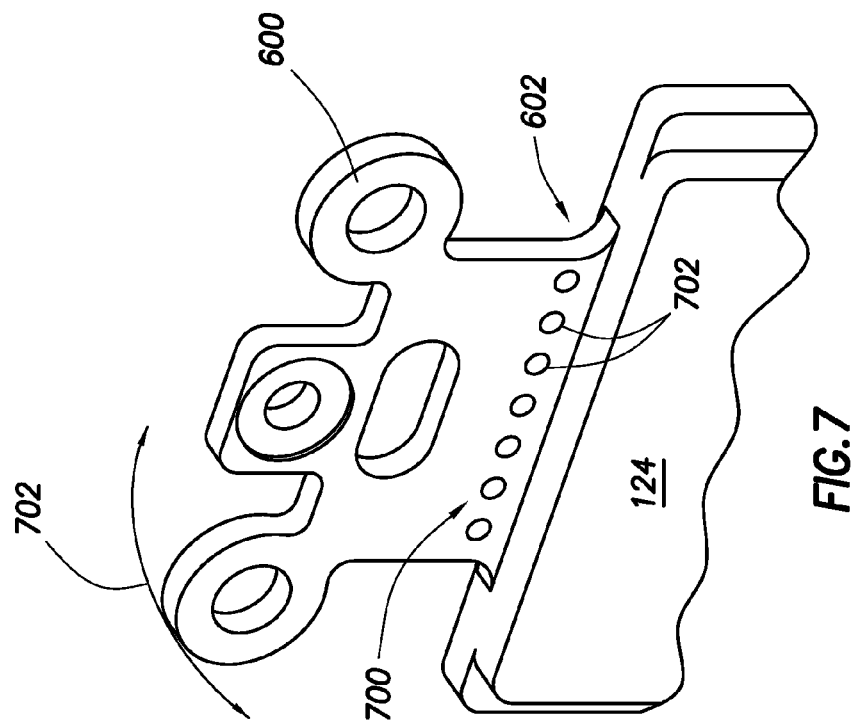
FIG. 7 shows a perspective view of an ear in accordance with at least some embodiments.

FIG. 7 illustrates a different feature that enables the ear 600 to be removed from the extension portion 124. In particular, the feature 700 of FIG. 7 is a series of illustrative dimples 702 along the proximal end 602 of the ear 600. The dimples 702 create an effective narrowing of the thickness of the ear 600 such that ear 600 may be removed by movement of the ear 600 as illustrated by line 702. That is, based on the movement illustrated by line 608, the material of the ear 600 breaks along the dimples 702, thus enabling removal of the ear 600. While the dimples 702 are shown as having a circular form, the dimples 702 may equivalently have any form (e.g., square, oblong, rectangular). Moreover, in some embodiments the dimples extend through the proximal end 602 to in effect be a series of apertures through the ear 600 at the proximal end 602.

Figure 8:
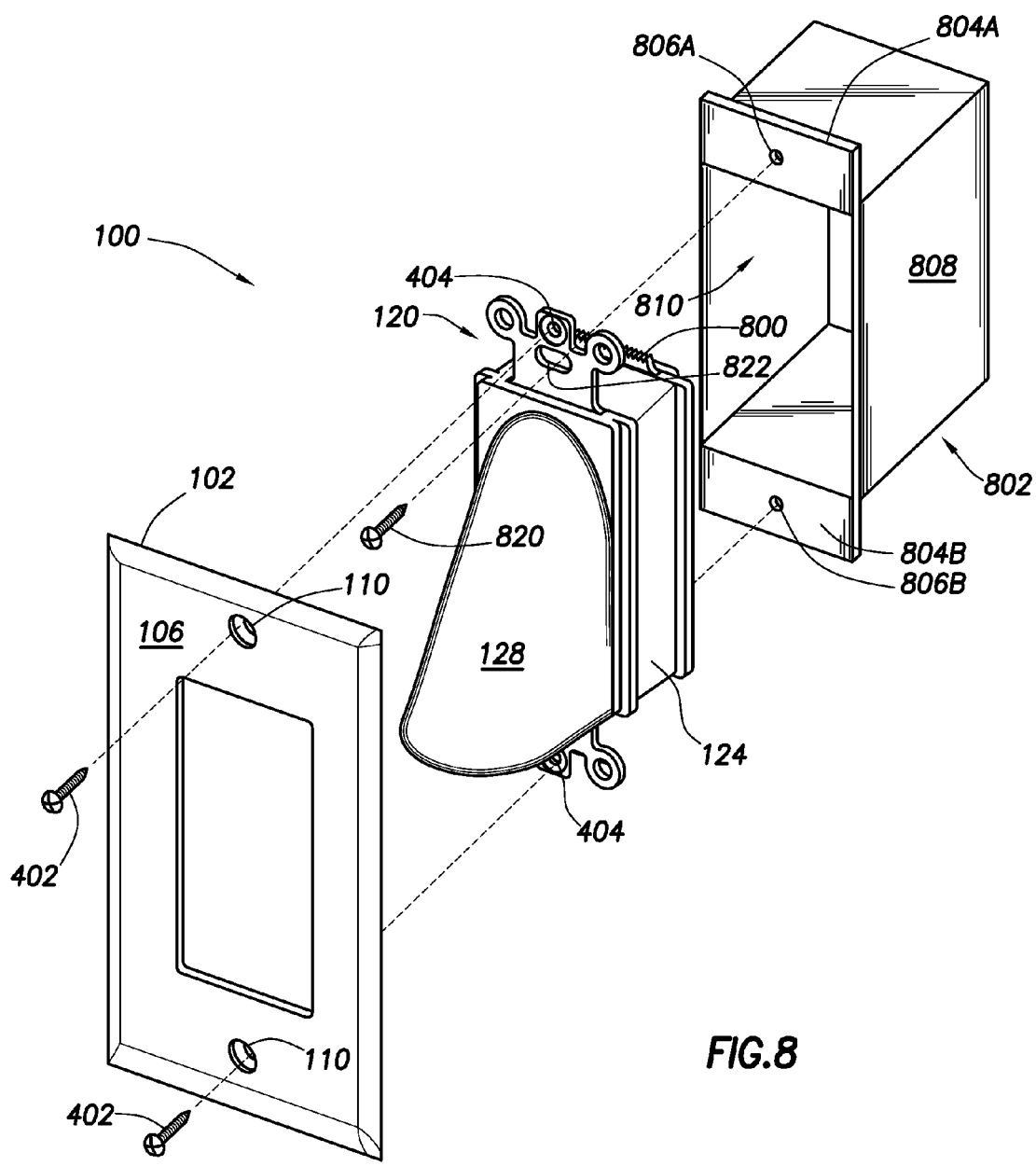
FIG. 8 shows an exploded perspective view of a faceplate system, including a wall box, in accordance with at least some embodiments.

FIG. 8 shows an exploded perspective view of a faceplate system 100. In particular, FIG. 8 illustrates faceplate 102 in relation to nose member 120, and further in relation to a wall box 802. The wall box 802 is illustratively shown as a single gang box that defines flange portions 804, with each flange portion 804 having an aperture 806 therein. Moreover, wall box 802 has wall portions 808 that define an internal volume 810. While wall box 802 is illustrated as a single-gang wall box, multiple gang wall boxes may be equivalently used. Moreover, some manufacturers produce flange-only systems that define flange portions 804, and may extend a slight distance into the wall, but which do not have sufficient wall portions 808 to define an internal volume. Nevertheless, the size of the aperture defined by the flange portions 804 is tall enough to accept the extension portion 124 of the nose member 120 so long as the unused ears are removed. Thus, nose member 120 is shown with the unused ears removed, as shown by ear remnant 800. Stated otherwise, in the particular embodiments shown the unused ears have been removed in order for the extension portion 124 to telescope within the wall box 802. Nose member 120 is shown in a configuration where the nose portion 128 will protrude in the direction of the front side 106 of the faceplate 102; however, the principle of removal of unused ears prior to insertion of the extension portion 124 (and nose portion 128) into the wall box 808 remains the same.

For the "decorator" style system illustrated, the nose member 120 couples to the wall box 802 by way of fasteners 820 (e.g., screws, and only one visible in FIG. 8) telescoping through oblong apertures 822 in the ears (only one aperture 822 is visible because of the nose portion 128) and threadingly connecting to the apertures 806 of the wall box 802. The faceplate 102 then couples to the nose member 120 by way of fasteners 402 telescoping through apertures 110, and the fasteners 402 threadingly connecting to the apertures 404 in the ears. Stated otherwise, in some embodiments the faceplate does not directly couple to the wall box 802; but rather, the faceplate 102 directly couples to the nose member 120, and the nose member 120 directly couples to the wall box 802.

Figure 9:
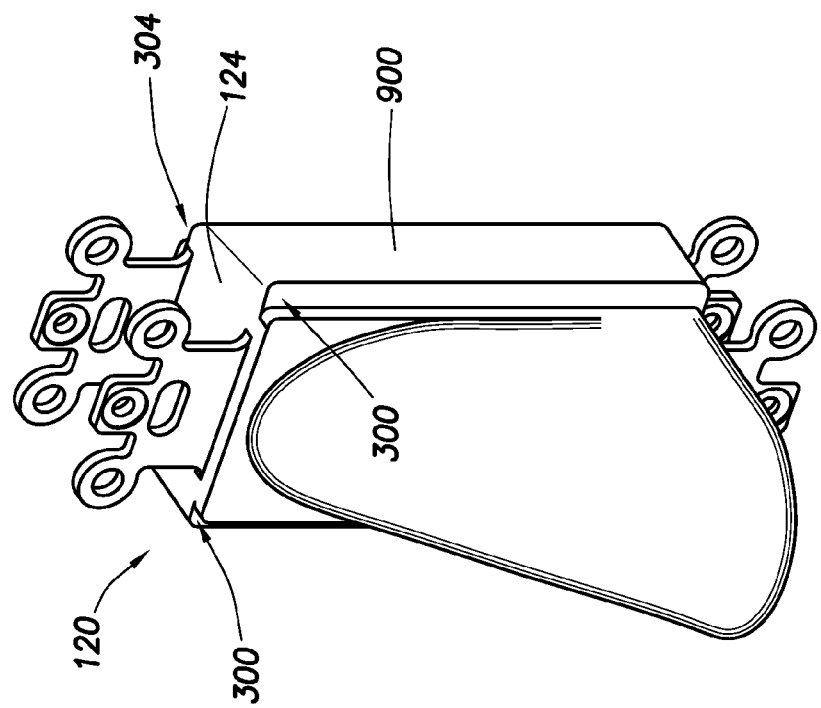
FIG. 9 shows a perspective view of a nose member in accordance with other embodiments.

FIG. 9 shows a perspective view of a nose member in order to illustrate alternative embodiments of nose member. In particular, FIG. 9 illustrates embodiments where the abutting surfaces 300, and the abutting surfaces 304 (not visible in FIG. 9) are created by the same flange 900 coupled to (or as part of) the extension portion 124. That is to say, rather than each abutting surface having its own flange portion to define the abutting surface, a single flange 900 (on each side) may be used to define both abutting surfaces 300 and 304.

Figure 10:
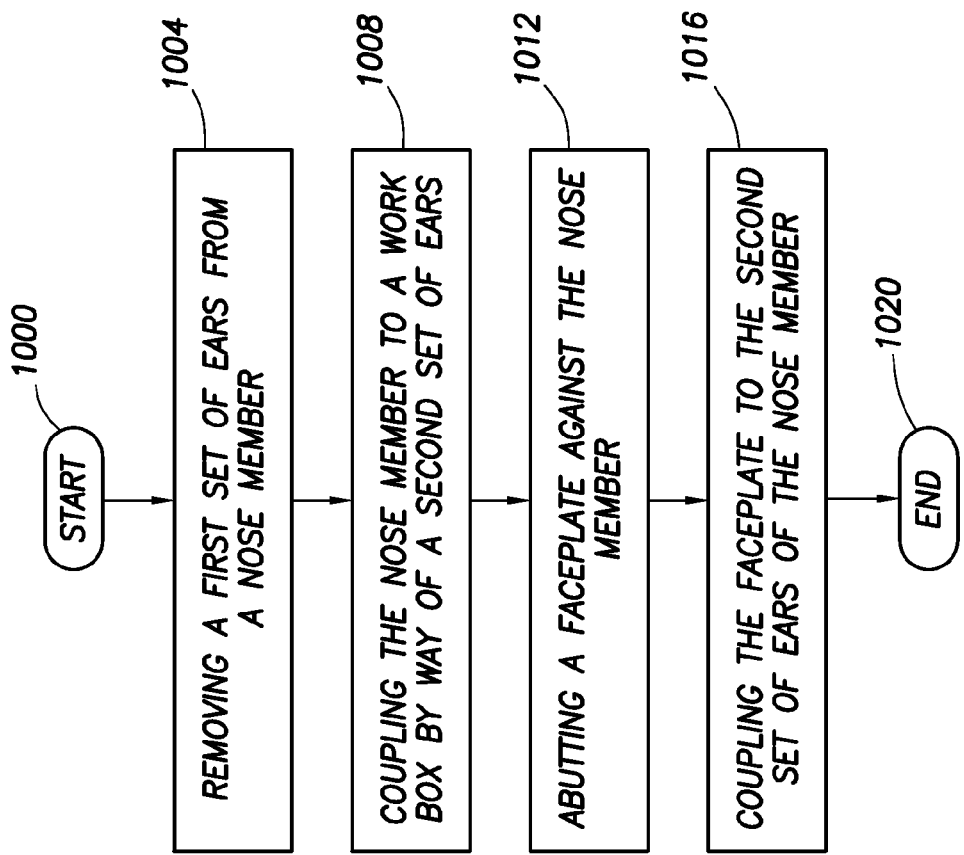
FIG. 10 shows a method in accordance with at least some embodiments.

FIG. 10 illustrates a method in accordance with at least some embodiments. While the illustrative method of FIG. 10 shows a particular order, the various steps may be equivalently combined, separated, or performed in a different order. In particular, the method starts (block 1000) and proceeds to removing a first set of ears from a nose member (block 1004). In a particular embodiment, each ear of the first set of ears is broken off at a proximal end thereof, and in some cases broken off along a feature specifically designed to facilitate removing the ear. Next, the nose member is coupled to a work box by way of a second set of ears (block 1008). Then, a faceplate is abutted against the nose member (block 1012), the faceplate coupled to the nose member (block 1016), and the method ends (block 1020).

The above discussion is meant to be illustrative of the principles and various embodiments. Numerous variations and modifications will become apparent to those skilled in the art once the above disclosure is fully appreciated. For example, while fasteners in the form of screws are illustrated to couple the nose member 120 to the wall box 802, and likewise to couple the faceplate 102 to the nose member 120, any fastening system (e.g., plastic clips, Velcro®, snap-latch system) may be equivalently used. Moreover, the nose portion 128 is shown with a particular rounded configuration, but in other embodiments the nose may take any shape, and the nose tip 204 need not necessarily align with the nose aperture 104 of the faceplate 102 and/or the bottom of the extension portion 124. That is, the nose tip 204 may be extended below the extension portion 124, or shortened to more fully expose the aperture 126 of the extension portion 124. Further still, the aperture 202 defined by the nose tip 204 need not open along the short dimension of the nose aperture 104 of the faceplate 102. In other embodiments, the aperture 202 defined by the nose tip 204 may open along the long dimension of the nose aperture 104. It is intended that the following claims be interpreted to embrace all such variations and modifications.

What is claimed is:

1. A faceplate system comprising:
    a faceplate that defines a front side, a back side and a nose aperture;
    a nose member that comprises:
        an extension portion that defines an aperture therein;
        a nose portion coupled to the extension portion, the nose portion at least partially occludes the aperture of the extension portion;
        a first abutting surface coupled to the extension portion and adjacent the nose portion;
        a second abutting surface coupled to the extension portion opposite the first abutting surface;
        a first set of ears coupled to the extension portion adjacent the nose portion, the first set of ears coplanar;
        a second set of ears coupled to the extension portion opposite the nose portion, the second set of ears coplanar;
    wherein the nose member is configured to couple to the faceplate in multiple configurations, comprising:
        a first configuration in which the nose portion protrudes through the nose aperture in the direction of the front side of the faceplate, the first abutting surface abuts the back side of the faceplate, and the faceplate is affixed to the first set of ears; and
        a second configured in which the nose portion protrudes in the direction of the back side of the faceplate, the second abutting surface abuts the back side of the faceplate, and the faceplate is affixed to the second set of ears.

2. The faceplate system of claim 1 further comprising:
    at least one ear comprises an aperture having internal diameter;
    the faceplate comprises a fastener aperture having an internal diameter, the fastener aperture separate from the nose aperture, and wherein the internal diameter of the fastener aperture is greater than the internal diameter of the aperture in the ear; and regardless of the configuration the faceplate affixes to the nose portion by way of a screw telescoped through the fastener aperture and threaded to the aperture of the ear.

3. The faceplate system of claim 1 further comprising each ear comprises a proximal end coupled to the extension portion, and a distal end extending outward from the extension portion, and at least one ear comprises a feature at the proximal end at which feature the ear detaches from extension portion.

4. The faceplate system of claim 3 wherein the feature is a narrowing of the thickness of the ear, and wherein the ear detaches by breaking the ear member along the feature.

5. The faceplate system of claim 3 wherein the feature is a series of dimples along the proximal end, and wherein the ear detaches by breaking the ear along the feature.

6. The faceplate system of claim 1 wherein the nose member further comprises:
    a first flange portion coupled to the extension portion adjacent the nose member, the first flange portion defines the first abutting surface; and
    a second flange portion coupled to the extension portion opposite the first flange member, the second flange portion defines second abutting surface.

7. The faceplate system of claim 1 wherein the nose member further comprises a flange portion, the flange portion defines the first and second abutting surfaces.

8. A method comprising:
    removing a first set of ears from a nose member;
    coupling the nose member to a work box by way of a second set of ears;
    abutting a faceplate against the nose member; and
    coupling the faceplate to the second set of ears of the nose member.

9. The method of claim 8 wherein removing the first set of ears further comprises breaking each ear of the first set of ear at a feature on a proximal end of the ear.

10. The method of claim 8 wherein removing the first set of ears further comprises breaking each ear along a narrowing of the thickness of the ear.

11. The method of claim 8 wherein removing the first set of ears further comprises breaking each ear along a series of dimples of the ear.

12. The method of claim 8 wherein abutting the faceplate further comprises abutting the faceplate with a nose portion of the nose member protruding in the direction of the backside of the faceplate.

13. The method of claim 8 wherein abutting the faceplate further comprises abutting the faceplate with a nose portion of the nose member protruding through an aperture in the faceplate, and the nose portion protruding in the direction of the front side of the faceplate.

14. The method of claim 8 wherein coupling further comprises telescoping a screw through an aperture in the faceplate and threading the screw into an aperture in an ear of the second set of ears.

15. A faceplate system comprising:
    a faceplate that defines a front side, a back side and a nose aperture;
    a nose member that comprises:
        an extension portion that defines an aperture therein;
        a nose portion coupled to the extension portion, the nose portion at least partially occludes the aperture of the extension portion;
        a first flange portion coupled to the extension portion adjacent the nose portion;
        a second flange portion coupled to the extension portion opposite the first flange portion;

a first set of ears coupled to the extension portion adjacent the nose portion, the first set of ears coplanar;

a second set of ears coupled to the extension portion opposite the nose portion, the second set of ears coplanar;

wherein the nose member is configured to couple to the faceplate in multiple configurations, comprising:

a first configuration in which the nose portion protrudes through the nose aperture in the direction of the front side of the faceplate, the first flange portion abuts the back side of the faceplate, and the faceplate is affixed to the first set of ears; and a second configured in which the nose portion protrudes in the direction of the back side of the faceplate, the second flange portion abuts the back side of the faceplate, and the faceplate is affixed to the second set of ears.

16. The faceplate system of claim 15 further comprising:
at least one ear comprises an aperture having an internal diameter;
the faceplate comprises a fastener aperture having an internal diameter, the fastener aperture separate from the nose aperture, and wherein the internal diameter of the fastener aperture is greater than the internal diameter of the aperture in the ear; and regardless of the configuration
the faceplate affixes to the nose member by way of a screw telescoped through the fastener aperture and threaded to the aperture of the ear.

17. The faceplate system of claim 15 further comprising each ear comprises a proximal end coupled to the extension portion, and a distal end extending outward from the extension portion, and at least one ear comprises a feature at a proximal end of the ear at which feature the ear detaches from extension portion.

18. The faceplate system of claim 17 wherein the feature is a narrowing of the thickness of the ear, and where the ear member detaches by breaking the ear along the feature.

19. The faceplate system of claim 17 wherein the feature is a series of dimples along the proximal end, and where the ear detaches by breaking the ear along the feature.

20. A nose member of a faceplate system, the nose member comprising:
an extension portion that defines an aperture therein;
a nose portion coupled to the extension portion, the nose portion at least partially occludes the aperture of the extension portion;
a first abutting surface coupled to the extension portion and adjacent the nose portion;
a second abutting surface coupled to the extension portion opposite the first abutting surface;
a first set of ears coupled to the extension portion adjacent the nose portion, the first set of ears coplanar;
a second set of ears coupled to the extension portion opposite the nose portion, the second set of ears coplanar;
wherein the nose member is configured to couple to a faceplate in multiple configurations, comprising:

a first configuration in which the nose portion protrudes through a nose aperture of the faceplate in the direction of a front side of the faceplate, the first abutting surface abuts a back side of the faceplate, and the faceplate affixed to the first set of ears; and a second configuration in which the nose portion protrudes in the direction of the back side of the faceplate, the second abutting surface abuts the back side of the faceplate, and the faceplate affixed to the second set of ears.

21. The nose member of claim 20 further comprising each ear comprises a proximal end coupled to the extension portion, and a distal end extending outward from the extension portion, and at least one ear comprises a feature at the proximal end at which feature the ear detaches from extension portion.

22. The nose member of claim 21 wherein the feature is a narrowing of the thickness of the ear, and wherein the ear detaches by breaking the ear member along the feature.

23. The nose member of claim 21 wherein the feature is a series of dimples along the proximal end, and wherein the ear detaches by breaking the ear along the feature.

24. The nose member of claim 20 wherein the nose member further comprises:
a first flange portion coupled to the extension portion adjacent the nose member, the first flange portion defines the first abutting surface; and
a second flange portion coupled to the extension portion opposite the first flange member, the second flange portion defines second abutting surface.

25. The nose member of claim 20 wherein the nose member further comprises a flange portion, the flange portion defines the first and second abutting surfaces.

* * * * *